WYATT W. GIVENS
INVENTOR

WYATT W. GIVENS
INVENTOR

BY Arthur F. Zobal
ATTORNEY

WYATT W. GIVENS
INVENTOR

BY Arthur F. Zobal
ATTORNEY

United States Patent Office 3,510,655
Patented May 5, 1970

3,510,655
REMOVAL OF BACKGROUND RADIATION
COMPONENT FROM PULSED NEUTRON
MEASUREMENTS
Wyatt W. Givens, Dallas, Tex., assignor to Mobil Oil
Corporation, a corporation of New York
Filed Mar. 14, 1968, Ser. No. 712,972
Int. Cl. G01t 1/16
U.S. Cl. 250—83.3                        17 Claims

ABSTRACT OF THE DISCLOSURE

The specification discloses a background-correcting technique wherein a logging tool, including a pulsed neutron source, is inserted in a borehole for pulsed neutron logging operations. Measurements are made of the quantity of radiation detected within a logging time window and within a secondary counting period during each cycle of operation of the source. Prior to logging, the counts observed within the same secondary counting period, in preliminary operations, are employed to form a count-dependent ratio. This ratio, along with a time-dependent ratio formed between the time of the logging window and another period, is multiplied with the counts observed in the secondary counting period, while logging, to form a correcting function. This correcting function is subtracted from the total counts observed within the logging window during logging operations.

BACKGROUND OF THE INVENTION

Field of the invention

This invention relates to a novel technique and system for reducing the effect of neutron background radiation from measurements obtained in pulsed neutron logging operations.

In such operations, a borehole tool containing a pulsed neutron source and a detector of thermal neutrons is lowered into a borehole wherein the source is operated to produce bursts of fast neutrons spaced in time. Following each burst, thermal neutrons are detected in order to obtain measurements of the decay of thermal neutrons in the formations. The measurements obtained may be mean-life or half-life measurements obtained from thermal neutron die-away determined generally from count rates within two time windows spaced between each neutron burst. Such measurements give information about the macroscopic absorption cross section of the formations and are employed to distinguish between salt-water and oil-bearing formations.

Description of the prior art

The sources which have been employed generally in commercial operations are accelerator-type sources consisting of an ion source and a target. Other sources which also are capable of being used may be mechanically actuated sources consisting of a rotating shutter, disposed between an alpha source and a target, for controlling the passage of alpha particles to the target for producing bursts of fast neutrons. In either type of source it has been found that fast neutrons may be produced during the quiescent interval of each cycle when the source is intended to be in an OFF condition. These neutrons irradiate the formations and result in a neutron background which is sensed by the detector. This background radiation may be defined as a steady-state background in each cycle which is present throughout each cycle at a certain level. This background level, however, is not constant during successive cycles but varies as the tool is moved through the borehole to different depths. Variation of background radiation at different depths is due to differences in the porosity and chemistry of the formations. These differences result in variations of the amount of absorption, by the formations, of the background neutrons from the source, hence resulting in variation in the background level of radiation sensed by the detector at different borehole depths.

The net effect of the background radiation detected, if not properly corrected for, is a reduction in the sensitivity of the measurements to the changes in formation characteristics since the radiation counted and measured during each logging time window will include radiation resulting from the burst of neutrons as well as radiation resulting from the background neutrons. Hence, the measurements obtained may result in misleading information.

It has been found to be difficult and impractical to correct the problem by completely stopping the production of the background neutrons.

SUMMARY OF THE INVENTION

In accordance with the present invention, the effect of the background is reduced by forming a correction function representative of radiation detected within the logging time window and due predominantly to radiation resulting from the irradiation of the formations with background neutrons from the source. The difference is formed between the correcting function and the total measurements obtained during the logging time window to obtain a resulting function representative of radiation detected within the logging time window and resulting predominantly from the irradiation of the formations with bursts of fast neutrons.

In accordance with a further aspect of the invention, the background radiation is properly corrected for by taking into account variations of the level of the background radiation at different borehole depths. During logging operations, the source is operated periodically in a predetermined manner to produce bursts of fast neutrons spaced in time, thereby defining successive cycles of operation. Each cycle includes at least three time periods, a first time period occurring when the source is operated to produce a burst of fast neutrons, a second time period following the termination of a neutron burst when thermal neutrons are decaying to background level, and a third time period occurring following the decay period and prior to the production of a subsequent burst of neutrons. While logging, the resulting radiation is detected by a suitable detector employed in the borehole tool. There is then formed a primary logging function representative of radiation detected within the logging time window which occurs within the second time period. Also formed is a secondary logging function representative of radiation detected within a secondary counting period during each cycle of operation. The secondary function is modified to obtain the correcting function which properly takes into account the changes in background level detected at different borehole depths.

Proper modification of the secondary function may be carried out by operating the source, prior to logging, in a borehole environment to irradiate the environment with bursts of fast neutrons. Detection of radiation resulting from the irradiation of the environment is carried out to form a background environment function representative only of the counts of background radiation detected. From radiation detected while the source is operating to produce bursts of fast neutrons, a secondary environment function is formed representative only of the counts of radiation detected within the secondary counting period. A count-dependent ratio is formed between the background environment function and the secondary environment function. This ratio then is employed during logging operations to modify the secondary logging function to form the proper correcting function. In one embodiment disclosed, a time ratio also is formed between the time of the logging window and the time of a third period. The correcting function is obtained by forming the product between the time-dependent ratio, the count-dependent ratio, and the secondary logging function obtained during logging operations.

The system for carrying out the present invention includes a suitable pulsed neutron source and a radiation detector located in a borehole tool and, in one embodiment, a number of timing gates for obtaining measurements of radiation detected within the desired logging time window and secondary counting period. The primary logging function obtained is applied to a subtraction circuit, while the secondary function is applied to a multiplier. This multiplier is adjusted to form the product between the two ratios and the counts measured within the secondary counting period while logging. The output of the multiplier is applied to the subtraction circuit, the output of which is recorded in correlation with depth to obtain the log desired.

DESCRIPTION OF SPECIFIC EMBODIMENTS

Figure 1:
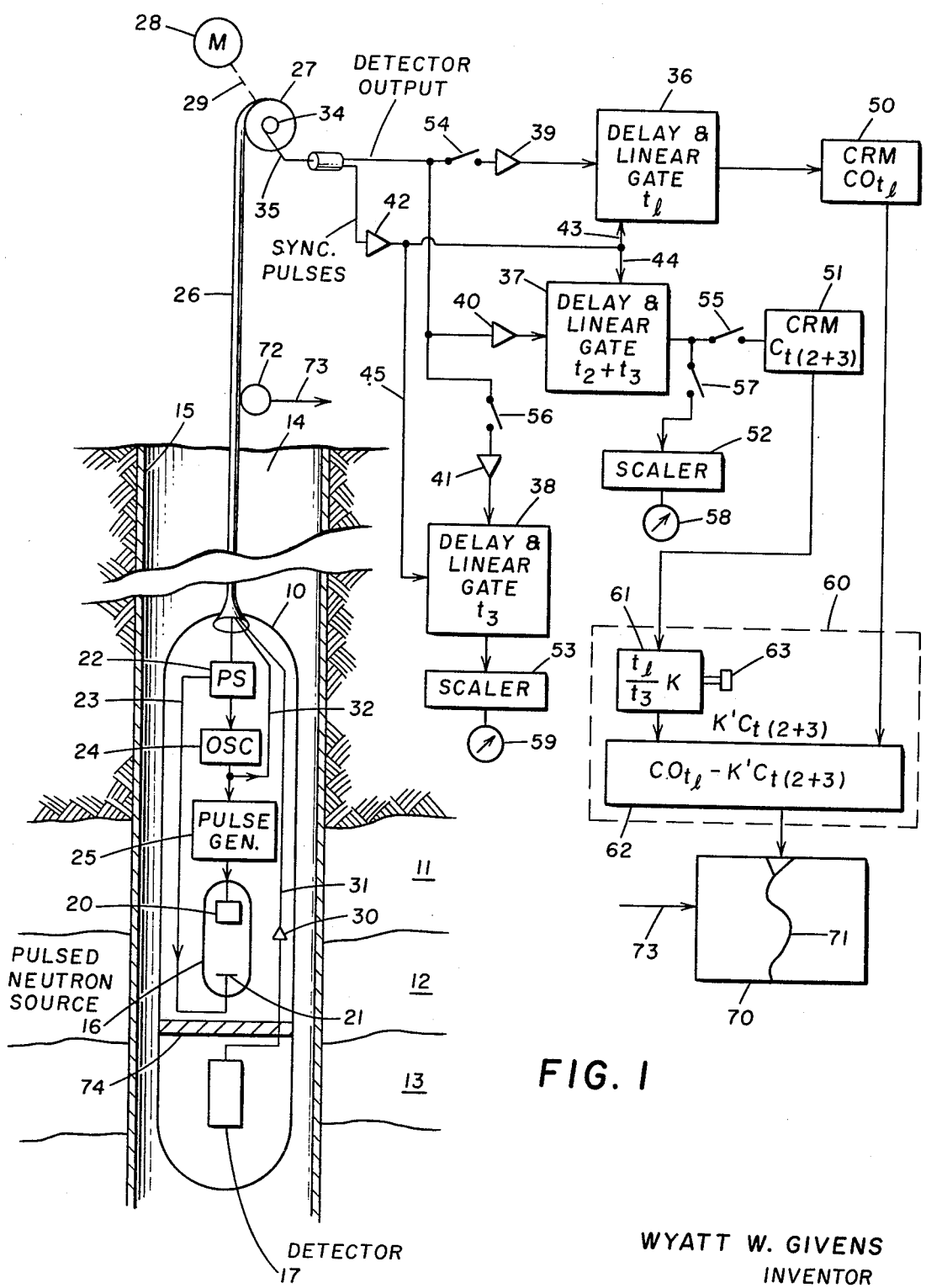
FIG. 1 illustrates a borehole system for carrying out the present invention.

Referring now to FIG. 1 of the drawings, there will be described the technique and system of the present invention for properly correcting for background radiation detected in pulsed neutron logging operations. The pulsed neutron system includes a borehole tool 10 which is used to investigate unknown formations, illustrated at 11, 12, and 13, traversed by a borehole 14 and lined with iron casing 15. The tool 10 contains a pulsed neutron source 16 and a radiation detector 17 which may be a thermal neutron detector or a gamma ray detector. The detector will be referred to as a thermal neutron detector in the description now to follow. In the embodiment of FIG. 1, the source 16 is illustrated as an accelerator-type source consisting of a source of ions 20 and a target 21. A high negative voltage or acceleration potential is applied to the target 21 by way of power supply 22 and conductor 23. Oscillator 24 triggers pulse generator 25 which in turn produces electrical pulses which actuate the ion source 20 for the production of ions. These ions are accelerated to the target 21 for the production of fast neutrons which irradiate the formation. The returning thermal neutrons in turn are detected by detector 17.

In some accelerator-type sources, it is difficult to stop completely the production of neutrons during the intended quiescent period of each cycle in the normal manner of operating the source. For example, it is desirable to apply continuously the accelerating potential to the target 21 and to produce bursts of fast neutrons by controlling the voltage applied to the ion source 20. When the ion source voltage is off, between pulses from generator 25, it has been found, however, that some ionization does take place. This is due in part to the strong electric field formed by the acceleration potential. The resulting ions formed accelerated toward the target 21 for production of background neutrons. The level of these undesired background neutrons generally is low. However, in some cases it is felt that it is at a level sufficient to result in the production of a thermal neutron density at the detector 17 which will cause error in the measurements desired. The thermal neutrons are formed as the background neutrons from the source 16 pass into the formations, are slowed to their thermal level, and appear at the detector 17.

Figure 2:
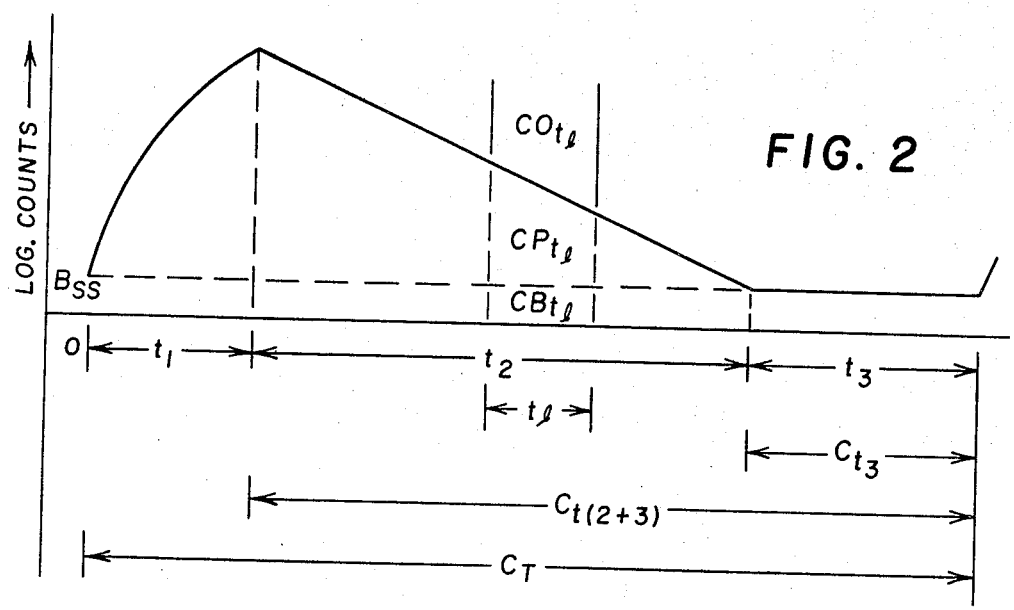
FIG. 2 illustrates curves useful in understanding the present invention.

This background level of thermal neutrons is illustrated at the $B_{SS}$ level in FIG. 2. This figure is a timing diagram of the logarithm of the counts of thermal neutrons appearing at the detector as a function of time during each operating cycle. The neutron burst from the source 16 begins at time zero and ends at the end of time $t_1$. The build-up in counts illustrated is that sensed by the detector. Time $t_2$ is the thermal neutron die-away period, during which time thermal neutrons are absorbed by the formations to background level. Time $t_3$ is the interval between the die-away period and the beginning of a subsequent burst of fast neutrons.

As can be understood, the background radiation detected and due to the background neutrons is produced throughout time periods $t_1$–$t_3$. In normal logging operations, measurements are carried out in time period $t_2$ within one or two time windows, only one logging time window $t_1$ being shown in FIG. 2. The total counts observed, $CO_{t_1}$, within logging time window $t_1$, however, will consist of one component $CP_{t_1}$ due only to the neutron burst applied to the formations and another component $CB_{t_1}$ due to the background neutrons which irradiate the formations. Thus, the total counts observed within the logging window are not dependent solely upon the neutron bursts and hence will give misleading information about the characteristics of the formations. Moreover, as indicated above, the background level will vary in magnitude at different depths due to porosity and chemistry changes of the formations.

In accordance with the present invention, the total counts observed within time $t_1$ are properly corrected to remove the effect of the background level within $t_1$, thereby producing a log which accurately reflects the changes in neutron density within time $t_1$ due only to the neutron burst applied to the formations. The correction properly takes into account the varying level of the background radiation within successive cycles at different depths, thereby giving an accurate log within all formations. The manner in which the proper corrections are obtained and applied now will be shown mathematically. The total counts observed, $CO_{t_1}$, within logging time window $t_1$, can be expressed as:

$$CO_{t_1} = CP_{t_1} + CB_{t_1} \quad (1)$$

Rearranging terms:

$$CP_{t_1} = CO_{t_1} - CB_{t_1} \quad (2)$$

The background count detected within $t_1$ may be found in the following manner:

$$CB_{t_1} = \left(\frac{t_1}{t_3}\right) C_{t_3} \quad (3)$$

wherein, $C_{t_3}$ represents the background counts detected within time period $t_3$.

Substituting the right-hand term of Equation 3 into Equation 2, one obtains the following:

$$CP_{t_1} = CO_{t_1} - \left(\frac{t_1}{t_3}\right) C_{t_3} \quad (4)$$

The term $C_{t_3}$ may be expressed as:

$$C_{t_3} = K C_{t(2+3)} \quad (5)$$

wherein, $C_{t(2+3)}$ is the total counts observed during time periods $t_2$ and $t_3$, and K is a constant equal to the ratio of $C_{t_3}$ to $C_{t(2+3)}$.

The ratio $C_{t_3}/C_{t(2+3)}$ will be a constant in any type of formation since $C_{t_3}$ is proportional to $C_{t(2+3)}$ and any change in $C_{t_3}$ in a given direction will be accompanied by a proportional change of $C_{t(2+3)}$ in the same direction. For example, in going from a nonporous formation to a porous formation, the total thermal neutron density, sensed at the detector within time $t_2$ and resulting from a fast neutron burst and from fast neutron background, will decrease. In addition, the total thermal neutron density within time $t_3$ and resulting from fast neutron background only also will decrease proportionately.

Since K is a constant, it may be obtained prior to actual logging operations from measurements made in a borehole environment with $t_2+t_3$ and $t_3$.

Substituting the right-hand term of Equation 5 into Equation 4 gives the desired expression for the thermal neutron count rate within $t_1$ and which is due only to the fast neutron bursts applied to the formations:

$$C_{t3} = KC_{t(2+3)} \quad (5)$$

While logging, the total counts within $t_2+t_3$ may be measured and modified by multipliers $t_1/t_3$ and K to obtain the correcting function $(t_1/t_3)KC_{t(2+3)}$ representative of the counts detected within $t_1$ and resulting only from the background fast neutrons. Since $C_{t(2+3)}$ will vary in different formations, the correcting function also will vary proportionately whereby the varying background within $t_1$ may be derived properly and removed while logging.

In the description above, it is noted that, while logging, counts are measured within $t_2$ as well as within $t_3$ in order to derive the correcting function. This is desirable in order to obtain a high count rate to improve the counting statistics and hence the correcting function derived while the tool is moving through the borehole.

Referring again to FIG. 1, the system for obtaining the desired measurements and the manner of operating the logging system now will be described in more detail. The logging tool 10 is passed through the borehole by way of cable 26 wound and unwound upon reel 27 driven by motor 28 and mechanical connection 29. The output of the detector 17 is applied to the surface by way of amplifier 30 and conductor 31. In addition, the output of oscillator 24 is applied to the surface by way of conductor 32 and is employed for sync purposes. At the surface, the sync pulses and detector pulses are taken from the cable conductors by way of slip rings and brushes illustrated at 34 and 35. The detector pulses are applied to delay and linear gate circuits 36–38 by way of amplifiers and discriminators 39–41. The sync pulses are amplified at 42 and applied to the delay and linear gate circuits 36–38 by way of conductors 43–45. The output of circuit 36 is coupled to count rate meter 50, while the output of circuit 37 may be coupled to count rate meter 51 or to scaler 52. In addition, the output of circuit 38 is coupled to scaler 53.

In operations, delay and linear gate circuits 36–38 are adjusted for response to thermal neutrons detected within the desired time windows. Circuit 36 is adjusted for response to the logging window $t_1$, while circuit 37 is adjusted for response to the secondary window $t_{(2+3)}$. This secondary window is employed to select detector pulses during logging operations and also prior to logging in order to obtain the denominator of the ratio forming the constant K. Circuit 38 is employed to select pulses during time $t_3$ prior to logging to obtain the numerator of the ratio forming the constant K.

Prior to logging, the constant K is determined by inserting the tool 10 into a borehole environment which preferably is the borehole itself. Switches 54 and 55 are opened and switches 56 and 57 are closed. The source 16 then is operated to produce bursts of fast neutrons for application to the environment. Circuit 37 passes thermal neutron pulses detected within times $t_2$ and $t_3$ to scaler 52, while circuit 38 passes the neutron detector output during time $t_3$ to scaler 53. The tool 10 may be held at one position, for example, for a period of about ten minutes, in order to improve the counting statistics. This is desirable since the background level within $t_3$ generally is relatively low. During this period, scalers 52 and 53 will record a relatively large number of counts per unit time on meters 58 and 59. The output of these meters 58 and 59 are taken as $C_{(t2+3)}$ and $C_{t3}$, respectively. The ratio then is formed between the values read from meters 59 and 58 to determine K. Thus, with the ratio K determined, logging operations may begin.

In carrying out logging operations, switches 54 and 55 are closed, while switches 56 and 57 are opened. While logging, the motor 28 is operated to move the tool 10 continuously through the borehole. The outputs of count rate meters 50 and 51 are applied to a computer 60 which consists of a multiplier unit 61 and a subtract circuit 62. Since the ratio $t_1/t_3$ is known as well as the constant K, their product may be formed to obtain a multiplying constant K'. This multiplying constant is applied to the multiplier 61, prior to logging, by suitable adjustments of control 63 whereby K', and hence $t_1/t_3$ K will be multiplied with $C_{t(2+3)}$ during logging operations. The output is applied to subtract circuit 62 wherein the function $$K'C_{t(2+3)}$$

is subtracted from $CO_{t_1}$ as measured by count rate meter 50. The output of subtract circuit 62 thus is representative of $CP_{t_1}$ and is applied to recorder 70 where a trace 71 is recorded which is representative of the thermal neutron density detected and resulting only from the neutron bursts. The chart of recorder 70 is driven in correlation with depth by reel 72 and connection 73 whereby the trace 71 is recorded as a function of the depth of the tool 10 in the borehole.

In the embodiment of FIG. 1, the thermal neutron detector 17 may be a commercially available proportional counter filled with helium-3 at superatmospheric pressure. A suitable neutron shield 74 may be located between the source 16 and detector 17. The count rate meters 50 and 51 and the scalers 52 and 53 are commericaly available systems. The delay and linear gate circuits 36–38 each may comprise a first monostable multivibrator actuated by the sync pulses and adjusted for a predetermined time delay for controlling a second monostable multivibrator adjusted to provide the desired time window. The output of the second multivibrator may be coupled to an AND gate which also is coupled to the output of the the radiation detector for sage of radiation during the time window selected. The analog computer 60 may be of the type manufactured by Electronics Associated, Inc., Long Branch, N.J., Model No. TR–20. The multiplier 61 and subtract circuit 62 are identified as programable subunits of the Model No. TR–20 analog computer.

Figure 3:
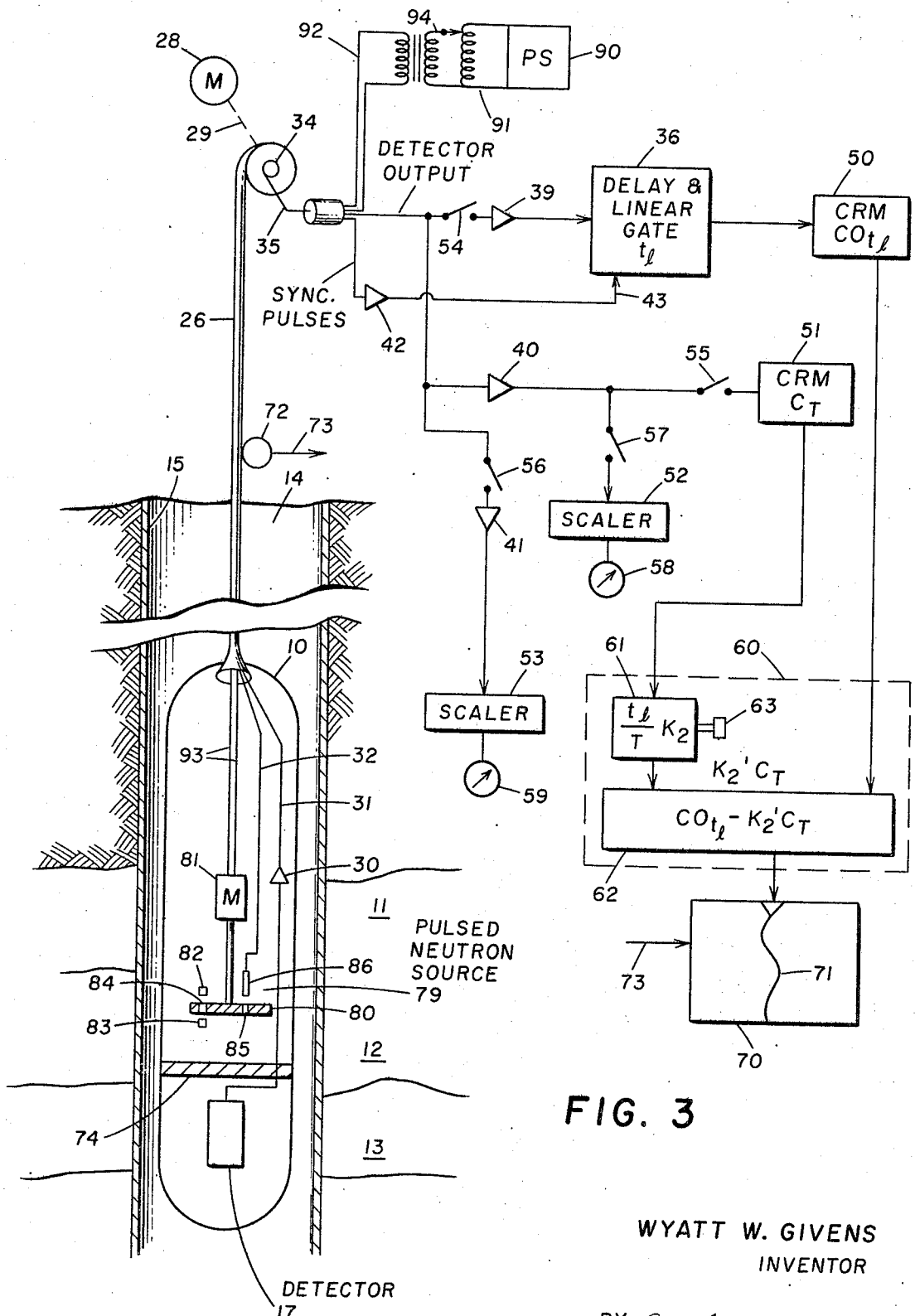

Referring now to FIG. 3, there will be described another embodiment employing a mechanically actuated pulsed neutron source 79 and the method of operating the system to correctly remove the background radiation within the logging time window. The system of FIG. 3 employs many of the same elements as employed in FIG. 1. Hence, like elements will be identified by like reference characters. The neutron source is of the type described in copending U.S. application Ser. No. 396,778 filed Sept. 15, 1964, by Richard L. Caldwell and Wyatt W. Givens. It comprises a metal shutter 80, rotated by motor 81, between a polonium source 82 and a beryllium traget 83. Aperture 84 is provided to obtain bursts of fast neutrons spaced in time upon rotation of the shutter. While only a single source 82 and target 83 and accompanying aperture 84 are disclosed, it is to be understood that a plurality of such sources, targets, and apertures may be employed to increase the neutron yield. The shutter 80 also has an aperture 85 extending therethrough in order to obtain a sync pulse from a detector 86 which may be a magnetic-responsive device.

The detector output and the sync pulses are applied to the surface instrumentation as described previously to obtain the desired measurement. The surface instrumentation is the same as that described in connection with FIG. 1 except delay and linear gates 37 and 38 are not employed. In addition, power supply 90 and autotransformer 91 are employed to start and stop the motor 81 to control the rotation of the shutter 80. The power supply is coupled to the motor 81 by way of conductors 92, the brushes and slip rings, and cable conductors 93. The position of the arm 94 of autotransformer 91 is varied to start and stop the motor 81.

Figure 4:
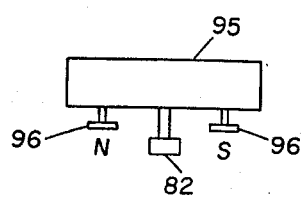
FIGS. 3 and 4 illustrates another system for carrying out the invention.

Referring to FIG. 4, the support 95 for supporting the polonium source 82 also supports magnets 96 of opposite polarity. These magnets are provided to ensure that the solid portions of the shutter 80 stop between the polonium source and target when the shutter stops rotating to prevent the passage of alpha particles from the polonium source to the target when the neutron source is in its OFF condition.

The delay and linear gates 37 and 38 of the system of FIG. 1 are not employed in the system of FIG. 3 since a slightly different technique is used to obtain the passage of radiation during the time window selected. The correcting function. The manner in which the correcting function is obtained to derive the desired measurements now will be expressed mathematically. In this application, the terms of Equations 1 and 2 remain the same. The background count within $t_1$, however, may be expressed as follows:

$$CB_{t_1} = \frac{t_1}{T} B_{SS_T} \qquad (7)$$

wherein,

T is the total period of each cycle, and $B_{SS_T}$ is the background radiation detected within time period T.

Substituting the right-hand term of Equation 7 into Equation 2, one obtains:

$$CP_{t_1} = CO_{t_1} - \left(\frac{t_1}{T}\right) B_{SS_T} \qquad (8)$$

The term $B_{SS_T}$ may be derived as follows:

$$B_{SS_T} = K_2 C_T \qquad (9)$$

$C_T$ is the count rate of all of the radiation detected within time period T while the source is operating to produce bursts of fast neutrons at a selected repetition rate, for example, 600 bursts per second, and $K_2$ is the ratio between $C_T$ and $B_{SS_T}$.

The term $B_{SS_T}$ may be obtained prior to logging by locating the tool 10 within the borehole environment, operating arm 94 of autotransformer 91 to place the neutron source 16 in its OFF condition, and, counting, with scaler 53 and meter 59, the thermal neutrons detected by detector 17. Counting may be carried out during a ten-minute period to obtain good statistics. In the tool of FIG. 3, fast neutron background will be produced by the source when it is in its OFF condition since contaminants of the material forming the source of alpha particles will be productive of a low level of fast neutrons. Further, fast neutrons at a low level will be produced when the alpha particles impinge the alpha source container and support and, in addition, the shutter 80.

The term $C_T$ may be obtained prior to logging by operating the neutron source 79, while the tool 10 is in borehole environment, to produce bursts of fast neutrons and measuring, with scaler 52 and meter 58, the resulting count rate of radiation detected. The source 79 is operated at the selected rate of about 600 burst per second and measurements are made preferably over a period of about ten minutes.

Having determined the constant $K_2$ and knowing the value of $t_1/T$, the appropriate multipliers may be applied to multiply circuit 61 to form a multiplying constant $K_2'$ by adjustment of control 63. Logging operations may be then carried out by moving the tool 10 through the borehole while operating the neutron source to produce bursts of fast neutrons at the selected rate of 600 bursts per second and detecting the resulting thermal neutrons with detector 17. The delay and linear gate circuit 36 will pass the detector output within $t_1$, while the count rate meter 51 will produce an output representative of $C_T$. The output $CO_{t_1}$ of count rate meter 50 will be applied to subtract circuit 62, while the output $C_T$ of count rate meter 51 will be applied to multiplier 61. Multiply circuit 61 will multiply the constant $K_2'$ and hence $t_1/T$ $K_2$ with $C_T$ to produce the desired correcting function which is subtracted from $CO_{t_1}$ in subtract circuit 62. The desired measurement then is recorded by recorder 70 as trace 71.

Figure 5:
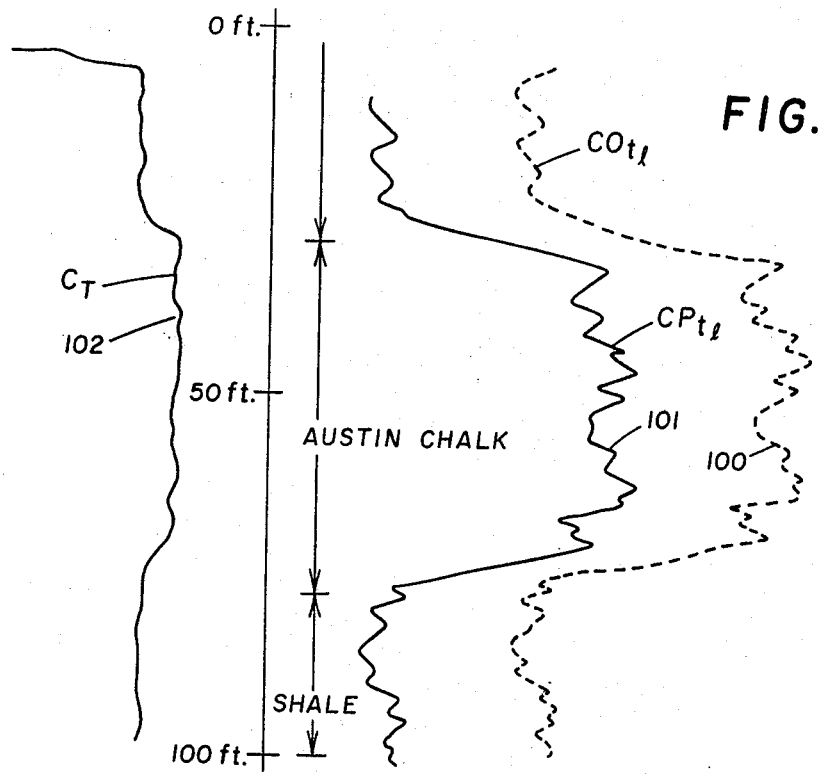
FIG. 5 illustrates traces obtained with the logging system of FIGS. 3 and 4.

Referring to FIG. 5, the dashed trace 100 represents a log obtained with the logging system of FIG. 3 and within a given time window but without correction for the steady-state component. The solid trace 101 represents the result obtained from the same data after the steady-state neutron background component has been removed. In addition, trace 102 indicates the count rate obtained within $C_T$. The two zones logged are the Austin chalk, which is a high count rate zone, and a shale, which is a low count rate zone. The uncorrected trace 100 indicates that the count rate for the Austin chalk is approximately twice the count rate for the shale. The corrected trace 101 for the same two zones, however, shows that the count rate of the Austin chalk actually is about three times the count rate for the shale. Thus, it can be seen that removal of the steady-state thermal neutron background yields data which has improved qualities for distinguishing formations one from another.

Although the detector 17 preferably is a thermal neutron detector, it is understood that a gamma ray detector may be employed instead to detect thermal neutron capture gamma rays within neutron bursts. Such a detector may consist of a sodium iodide crystal coupled to a photomultiplier tube. At the surface, the detector output preferably will be applied to a single-channel pulse height analyzer before application to the delay and gating circuitry or to the counting circuitry. The analyzer or analyzers employed will be adjusted to pass the detector output within a predetermined energy range, for example, in a range beginning above about 2.3 mev. and extending to slightly below 7 mev.

Now that the invention has been described, modifications will become apparent to those skilled in the art and it is intended to cover such modifications as fall within the scope of the appended claims.

What is claimed is:

1. In pulsed neutron logging operations, a method of correcting for background radiation detected and resulting from the irradiation of the formations with background neutrons from a neutron source, comprising the steps of:

passing said source through a borehole traversing formations of interest, operating said source to irradiate the formations with bursts of fast neutrons spaced in time thereby defining successive cycles of operation, detecting radiation resulting from the irradiation of said formations with neutrons, said radiation detected including radiation resulting from the irradiation of said formations with bursts of fast neutrons and radiation resulting from the irradiation of said formations with background neutrons from said source, forming a logging function representative of radiation detected within a logging time window occurring after termination of said neutron bursts and while neutrons are decaying to background level in the formations, forming a correcting function representative of radiation detected within said logging time window and due predominantly to radiation resulting from the irradiation of said formations with background neutrons from source, and forming the difference between said logging function and said correcting function to obtain a resultant function representative of radiation detected within said logging time window and resulting predominantly from the irradiation of said formations with said bursts of fast neutrons.

2. The method of claim 1 wherein:
said correcting function is formed from radiation detected within a secondary counting period during each cycle of operation.

3. The method of claim 1 wherein said correcting function is formed by:
forming a secondary logging function representative of radiation detected within a secondary counting period during each cycle of operation,
said secondary counting period occurring during a time period which includes the time during which neutrons from said source are decaying to the background level in the formations following the termination of said neutron bursts, and
modifying said secondary logging function to obtain said correcting function.

4. In pulsed neutron logging operations, a method of correcting for detected background radiation resulting from the irradiation of the formations with background neutrons from a neutron source and wherein said logging operations include the periodic operation of said source in a predetermined manner to produce bursts of fast neutrons spaced in time, thereby defining successive cycles of operations, each cycle including at least three time periods, a first time period occurring when said source is operated to produce a burst of fast neutrons, a second time period following the termination of said neutron burst and when neutrons are decaying to background level, and a third period occurring following the decay period and prior to the production of a subsequent burst of neutrons, comprising the steps of:
carrying out logging operations by passing said source through a borehole traversing formations of interest,
operating said source in said predetermined manner to irradiate the formations with bursts of fast neutrons,
detecting radiation resulting from the irradiation of said formations with neutrons,
said radiation detected including radiation resulting from the irradiation of said formations with bursts of fast neutrons and radiation resulting from the irradiation of said formations with background neutrons from said source,
forming at least one primary logging function representative of radiation detected within a logging time window occurring within said second period,
forming a secondary logging function representative of radiation detected within a secondary counting period during each cycle of operation,
modifying said secondary function to obtain a correcting function representative of radiation detected within said logging time window and due predominantly to radiation resulting from the irradiation of said formations with background neutrons from said source, and
forming the difference between said primary logging function and said correcting function to obtain a resultant function representative of radiation detected within said logging window and resulting predominantly from the irradiation of said formations with said bursts of fast neutrons.

5. The method of claim 4 wherein said correcting function is obtained by:
prior to logging, positioning said source in a borehole environment to irradiate said environment with fast neutrons,
detecting radiation resulting from the irradiation of said environment with fast neutrons,
forming a background environment function representative only of the counts of background radiation detected,
from radiation detected while said source is operating in said predetermined manner, forming a secondary environment function representative of counts of radiation detected within said secondary counting period,
forming a count-dependent ratio between said background environment function and said secondary environment function, and
while logging, employing said count-dependent ratio to modify said secondary logging function to form said correcting function.

6. The method of claim 5 wherein:
said secondary logging function is modified by forming the product between values including said count-dependent ratio and said secondary logging function,
said source being productive of background fast neutrons continuously when operated in said predetermined manner.

7. The method of claim 6 wherein:
said source is operated in said predetermined manner in said borehole environment to form said background environment function,
said background environment function being formed from radiation detected only during said third time period.

8. The method of claim 7 including the steps of:
forming a time-dependent ratio between the time of said logging window and the time of said third period, and
employing said count-dependent ratio and said time-dependent ratio to modify said secondary logging function to form said correcting function.

9. The method of claim 8 wherein:
said correcting function formed is representative of the product between said count-dependent ratio, said time-dependent ratio, and said secondary logging function.

10. The method of claim 9 wherein:
said source employed is an accelerator type neutron source having a source of ions and a target for emitting fast neutrons when irradiated with said ions.

11. The method of claim 6 wherein:
said background environment function is obtained by placing said source in a condition to produce only background neutrons for application to said environment,
detecting radiation resulting from the irradiation of said environment with said background neutrons, and
forming said background environment function representative only of the counts of background radiation detected.

12. The method of claim 11 including the steps of:
forming a time-dependent ratio between the time of said logging window and the period of each cycle of operation, and
employing said count-dependent ratio and said time-dependent ratio to modify said secondary logging function to form said correcting function.

13. The method of claim 12 wherein:
said correcting function formed is representative of the product between said count-dependent ratio, said time-dependent ratio, and said secondary logging function.

14. The method of claim 13 wherein:
said source employed is a mechanically actuated neutron source having a secondary source of radiation and a target with a shutter located therebetween for controlling the passage of radiation from said secondary source to said target.

15. In a pulsed neutron logging system, a system for correcting for the effect of background neutrons emitted by a pulsed neutron source and which irradiates the formations, comprising:

a borehole tool containing a pulsed neutron source for producing bursts of fast neutrons spaced in time thereby defining successive cycles of operation, said source additionally producing background neutrons continuously while in operation, a detector spaced from said source for detecting radiation resulting from the irradiation of said formations with fast neutrons, means including a selecting means coupled to said detector for producing a logging function representative of the counts of radiation detected within a predetermined logging time window, means for producing a secondary function representative of the counts of radiation detected within a secondary counting period during each cycle of operation, said logging function and said secondary function being formed from detected radiation resulting from the irradiation of the formations with bursts of fast neutrons and with background fast neutrons, means for modifying said secondary function to form a correcting function representative of radiation detected within said logging time window and due predominantly to radiation resulting from the irradiation of the formations with background fast neutrons from said source, means for forming the difference between said logging function and said correcting function to form a resultant measurement representative of radiation detected within said logging time window and resulting predominantly from the irradiation of the formation with bursts of fast neutrons, and means for recording said resultant measurement in correlation with the depth of said borehole tool in said borehole.

16. In pulsed neutron logging operations, a method of correcting for background radiation detected and resulting from the irradiation of the formations with background neutrons from a neutron source, comprising the steps of:

passing said source through a borehole traversing formations of interest, operating said source to irradiate the formations with bursts of fast neutrons spaced in time thereby defining successive cycles of operation, detecting radiation resulting from the irradiation of said formations with neutrans, said radiation detected including radiation resulting from the irradiation of said formations with bursts of fast neutrans and radiation resulting from the irradiation of said formations with background neutrons from said source, forming a logging function representative of radiation detected within a logging time window occurring after termination of said neutron bursts and while neutrons are decaying to background level in the formations, forming a secondary logging function representative of radiation detected within a secondary counting period during each cycle of operation and having a length in time greater than the time of said logging window, modifying said secondary function with a modifying function to obtain a correcting function representative of radiation detected within said logging time window and due predominantly to radiation resulting from the irradiation of said formations with background neutrons from said source, and forming the difference between said logging function and said correcting function to obtain a resultant function representative of radiation detected within said borehole window and resulting predominantly from the irradiation of said formations with said bursts of fast neutrons.

17. The method of claim 16 wherein said modifying function is obtained from preliminary irradiation and detection operations carried out in a borehole environment prior to logging operations.

References Cited

UNITED STATES PATENTS

| | | |
|---|---|---|
| 3,108,188 | 10/1963 | Dewan et al. |
| 3,336,476 | 8/1967 | Richardson _____ 250—83.3 |
| 3,373,280 | 3/1968 | Mills. |
| 3,388,253 | 6/1968 | Mills. |

ARCHIE R. BORCHELT, Primary Examiner

U.S. Cl. X.R.

250—83.1, 83.6

PO-1050
(5/69)

UNITED STATES PATENT OFFICE
CERTIFICATE OF CORRECTION

Patent No. 3,510,655     Dated May 5, 1970

Inventor(s) Wyatt W. Givens

It is certified that error appears in the above-identified patent and that said Letters Patent are hereby corrected as shown below:

Column 2, line 29, "resulting" should read --resultant--.
Column 3, line 29, "illustrates" should be --illustrate--;
          line 69, before "accelerated" insert --are--.
Column 5, line 9, "with" should be --within--;
          line 14, should read:

$$--CP_{t_\ell} = CO_{t_\ell} - \left(\frac{t_\ell}{t_3}\right) KC_{t(2+3)} \quad (6)--;$$

line 73, "genera ly" should read --generally--.
Column 6, line 2, after "as" the count representations should be $--C_{t(2+3)}$ and $C_{t_3}--$;
          line 36, "mericaly" should be --mercially--;
          line 44, "sage" should be --passage--;
          line 62, "traget" should be --target--.
Column 7, line 19, the entire line, namely, "passage of radiation during the time window selected. The" should be deleted;
          line 20, after "which" the word "the" should be --this--;
          line 40, --wherein,-- should be inserted;
          line 64, "burst" should be --bursts--.
Column 12, line 2, "neutrans" should be --neutrons--;
           line 5, "neutrans" should be --neutrons--.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents